Nov. 4, 1958  J. W. KICE ET AL  2,858,759
CEILING AIR MIXER CABINET AND METHOD OF HEATING
Filed March 21, 1955
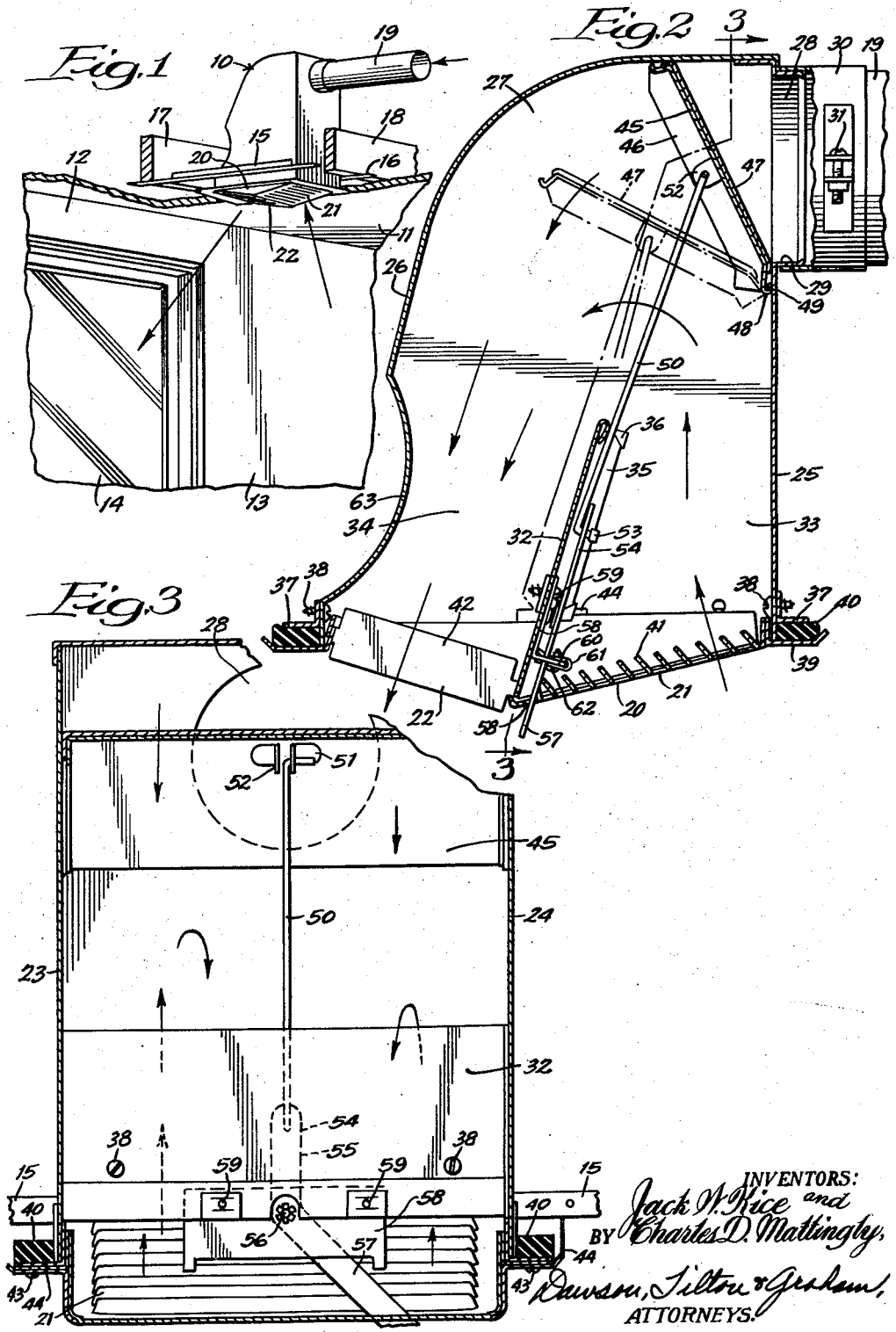
INVENTORS:
Jack W. Rice and
Charles D. Mattingly,
BY Dawson, Tilton & Graham
ATTORNEYS.

United States Patent Office 2,858,759
Patented Nov. 4, 1958

2,858,759

CEILING AIR MIXER CABINET AND METHOD OF HEATING

Jack W. Kice and Charles D. Mattingly, Wichita, Kans., assignors to The Coleman Company, Inc., Wichita, Kans., a corporation of Kansas Application March 21, 1955, Serial No. 495,397

4 Claims. (Cl. 98—38)

This invention relates to an air mixer cabinet and method of heating, and more particularly to an air mixer cabinet constructed and arranged for installation in the ceiling of a room and adapted to provide perimeter heating of the room.

Ordinarily, in hot air heating systems heated air is introduced into a room space at or adjacent the floor level thereof, for in this manner advantage is taken of the normal tendency of heated air to rise and thereby provide a circulation pattern for the heated air through the room. Attempts to introduce heated air into a room space at or near the ceiling thereof have been entirely unsatisfactory, for it is virtually impossible using commercially feasible equipment to force the heated air down to the floor level of the room. As a result, serious air stratification exists, and the upper levels of the room space become excessively heated while the lower levels remain cold. For this reason, among others, ceiling air mixer cabinets have remained unknown in the art for it has been the common belief that cabinets of this character could not function to provide the desired heating results.

We have discovered, surprisingly, that heated air if mixed with room air can be discharged at ceiling level into a room space by using substantially standard and commercially feasible equipment, and made to circulate to the floor level of the room. And it is accordingly an object of this invention to provide an apparatus and method for accomplishing this result. Another object of the invention is to provide a method for perimeter heating of a room wherein hot air is mixed with room air, and the mixture discharged into a room space from the ceiling thereof so as to provide a circulation pattern following generally the room perimeter. Still another object is in the provision of a ceiling air mixer cabinet to accomplish that result.

A further object is to provide apparatus and a method for heating a room space wherein room air is mixed with heated inlet air, and the mixture circulated through the room, the room air for mixing being relatively warm air drawn from the upper portions of the room space, whereby the same air while high in heat content is recirculated numerous times through a room space with the result that efficient use is made of the heat added to the air supplied to a room space and this prevents stratification.

Still a further object is in providing an air mixer cabinet in combination with the ceiling of a room space, the cabinet having an outlet port for mixed air and an outlet port for room air, both communicating through the ceiling with the room space, and having also an inlet opening for heated air positioned so that the addition of heated air into the cambinet aspirates room air thereinto, the outlet port being directed preferably toward an outside wall of a room space whereby the heated air sweeps downwardly thereover to the floor level of the room. Additional objects and advantages will appear as the specification proceeds.

An embodiment of the invention is illustrated in the accompanying drawing, in which—

Figure 1 is a broken perspective view showing an air mixer cabinet of this invention mounted in the ceiling of a room space; Figure 2 is a vertical sectional view taken through substantially the center of the air mixer cabinet; and Figure 3 is a vertical sectional view looking in the opposite direction and being taken along the line 3—3 of Figure 2.

Figure 1 shows an air mixer cabinet that is designated generally with the numeral 10 mounted within the ceiling 11 of a room space 12 defined also in part by an outside wall 13 having a window 14 therein. The air mixer cabinet 10 is equipped on each side thereof with installation angles 15 and 16 that are rigidly secured thereto, and that are in turn rigidly secured to the joists 17 and 18. The air mixer cabinet 10 can be installed in any ceiling structure, whether the ceiling is plastered, formed from dryboard, etc. The cabinet 10 is supplied with heated air through a distribution conduit 19 that is preferably relatively small in diameter and that carries air that is heated under pressure and at relatively high velocity and discharges the same into the cabinet. Secured to the cabinet 10 and depending beneath the ceiling 11, is a grille 20 providing an inlet port for room air 21 and an outlet port 22 for discharging mixed air into the room space 12.

Referring now to Figures 2 and 3, it is seen that the air mixer cabinet 10 has spaced apart side walls 23 and 24, a forward or front wall 25 and a rear wall 26. The side walls 23 and 24, front wall 25 and rear wall 26 that is arcuate and curves forwardly to provide in part a top closure for the cabinet, are all secured rigidly together by any suitable means such as spot welding to provide and define a chamber or compartment 27. The forward wall 25 is struck outwardly adjacent the upper portion thereof to provide an air inlet opening 28 for admitting heated air from the conduit 19 to the chamber 27. As is shown in Figure 2, the distribution conduit 19 is connected to the collar 29 about the air inlet opening 28 by means of a fitting 30 that telescopically receives the end portion of the conduit 19 and flange 29 therein, and that is clamped tightly thereabout by the bolt and lug arrangement 31.

The bottom of the cabinet 10 is open and extending generally upwardly within the compartment 27 and between the side walls 23 and 24, is a partitioned wall or element 32 that divides the open bottom of the compartment into two separate and separated flow passages 33 and 34. The partition element 32 is rigidly secured to the side walls 23 and 24 by any suitable means, and if desired the element may be turned laterally along the sides thereof to provide flanges 35 that abut the side walls and that may be held in position along the side walls of the pockets 36 and by welding or sheet metal screws etc. that will serve to rigidly unite the flanges 35 with the side walls of the cabinet.

Extending about the outer surface of the cabinet 10 adjacent the open lower end thereof are angle members of generally L-shape, and that are designated with the numeral 37. The angle members 37 are secured to the cabinet by screws 38. The base leg of each of the channel members 37 extends outwardly at generally right angles to the walls of the cabinet. As is shown best in Figures 1 and 2, the grille 20 is provided with an outwardly extending peripheral flange 39 that is in substantial alignment with the base leg of the channel members 37. Interposed between the channel members and the flange 39 of the grille, when the grille is in position as shown in Figures 1 and 2, is an insulation pad 40 that is preferably formed of fiber glass and that is compressible and that serves the function of preventing the escape of air from the mixer cabinet 10 about the flange 39 of the grille so as to prevent streaking of the ceiling in the areas thereof adjacent the grille 20, and especially the flange 39 thereof.

The side walls of the grille 20 are generally V-shaped and have angularly inclined lower edges that meet adjacent the lower edge of the partition element 32. The inlet and outlet ports 21 and 22 in the grille 20 then are angularly disposed relative to each other and relative to the horizontal ceiling 11. The inclined port 21 communicates with the flow passage 33 within the cabinet, while the discharge port 22 communicates directly with the flow passage 34 within the cabinet. The inlet port 21 is defined by a plurality of spaced apart inwardly-struck louvers 41 that extend transversely across the cabinet 10, and the port 22 is defined by a plurality of spaced apart louvers 42 that extend generally longitudinally or at right angles to the transverse louvers 41. As is shown best in Figure 1, the discharge port 22 for mixed air is inclined downwardly and outwardly toward the wall 13 of the room space 12, while the inlet port for room air is oriented downwardly and inwardly toward the center of the room space 12. The grille 20 may be held in position in closing or covering relation about the open bottom end of the cabinet 10 by means of cap screws 43 that extend through the peripheral flange 39 of the grille and are threadedly received within lugs 44 that extend laterally from the side walls 23 and 24 of the cabinet at substantially the midpoint thereof.

A damper 45 having a peripheral flange 46 substantially abutting the walls of the cabinet 10, and which may be equipped with a pad 47 of fibrous insulating material, extends angularly across the cabinet 10 adjacent the inlet opening 21 thereof, and is turned upwardly at its bottom end as is shown at 48 to provide a hinge that is pivoted about a hinge pin 49 that permits the damper to be swung between the closed position illustrated by full lines in Figure 2, and the open position indicated by the broken lines in Figure 2. To provide selective control of the damper 45, a control rod 50 at its upper end is turned laterally and is pivotally received within a lug 51 provided by the damper, and is held in place within the lug 51 by the stop lug 52. The rod 50 at its lower end is turned laterally, as is shown at 53 in Figure 2, and is pivotally received within an appropriate opening in the leg 54 of a lever 55, that is mounted intermediate its end on a pivot pin 56 and that has a lower depending leg 57 that extends through an opening 58 in the grille 20 to provide a handle for manipulating the rod 50 and damper 45 connected thereto. It will be apparent that in the position of the lever as shown in Figures 2 and 3, the damper 45 is closed while if the handle 57 of the lever is swung to the left, as viewed in Figure 3, about the pivot point 56, the rod 50 will be drawn downwardly to lower the damper and open the air inlet 28.

It is desired to provide means for firmly holding the handle portion 57 of the lever in any selected position, and in the exemplary arrangement shown for this purpose, a bracket 58 is secured to the partition element 32 centrally thereof by sheet metal screws 59. The bracket 58 along its lower edge and centrally thereof is turned upwardly, as is shown at 60 in Figure 2, and defines a space or elongated slot through which the handle portion 57 of the lever may be moved freely. A friction member 61 is secured to the outwardly extending flange portion 60 of the bracket by means of screws 62, and functions so as to frictionally grip the handle 57 of the lever and thereby hold it at any selected position to which it may be moved.

In use of the structure, the blender or air mixer cabinet 10 is mounted in the ceiling of a room space, as is in Figure 1. Preferably, the mixer cabinet is mounted in close proximity to an outside wall of the room space, and most desirably is positioned so that mixed air flowing downwardly and laterally through the port 22 is directed toward a window area in the outside wall. The grille 20 is attached to the cabinet 10 after the cabinet has been installed and after the ceiling surfacing has been provided. The distribution conduit 19 is connected to the cabinet 10 so as to communicate with the inlet opening 28 for heated air. It will be appreciated that the conduit 19 will be connected to a hot air furnace or heating unit of some character, and will deliver under pressure and at relatively high velocity heated air. Ordinarily, the air delivered will be at a temperature of about 180° to 190° F.

When the handle 57 of the lever 55 is in the position shown in the drawing, the damper is in closed position and no heated air enters the cabinet 10 from the distribution conduit 19. At this time, there will be substantially no flow of air inwardly into the cabinet through the port 21, and outwardly from the cabinet through the port 22. When the lever is moved so as to drop the damper 45 slightly to open the inlet for heated air, heated air will flow into the cabinet 10 and will sweep over the partition element and downwardly along the arcuate contour of the rear wall 26. The flow of heated air past the partition element and over the flow channel 33 will cause room air to be drawn into the cabinet through the inlet port 21 and passage 33. This room air will mix with the heated air that flows downwardly and outwardly through the passage 34 and discharge port 22, and the mixed air will be discharged into the room space 12.

It has been determined that heated air directed from the distribution conduit 19 and downwardly through the discharge port 22 will not follow along the room wall 12 to the floor level when room air is not permitted to flow into the mixer cabinet through the inlet port 21. Apparently, the buoyancy of the hot air overcomes the force directing it downwardly, and before the heated air reaches the floor level it commences to rise in the room space. However, in the mixer cabinet 10 the flow pattern is such that room air is drawn into the cabinet and mixes with the heated air. The air mixture, it has been found, will flow downwardly along the wall 13 and window 14 thereof to the floor level and spreads along the floor and circulates thereabout before it begins to rise. Thus, perimeter heating of the room space 12 is provided by the system.

The room air drawn into the cabinet through the inlet port 21 is at a relatively high temperature because it is drawn from the uppermost portions of the room space. Thus, the heat retained in such air is not wasted for that air is again, in mixed condition with added heated air, recirculated through the room space to heat the same.

The damper 45 can be moved between complete open and complete closed positions incrementally and set at any desired position. Greater or lesser amounts of heated air will be admitted through the cabinet 10 depending upon the precise positioning of the damper 45. As the damper is closed, when less heat is required one would think that the aspiration rate would decrease and the total room circulation would be too little for comfort. Surprisingly, as the damper closes, the primary air velocity is increased, which causes a higher proportionate aspiration rate. The total room circulation flow pattern remains at a near constant for most of the damper control range, and this increase of room air in the mixture, further reduces buoyancy so the air stream flows down to the floor level in spite of the lower quantity of primary air.

As has been brought out before, it is desirable to direct the discharged air mixture toward an outside wall of the room space being heated, and the angular orientation of the discharge port 22 helps to accomplish this result. It is noted that the angular disposition of the ports 21 and 22 relative to each other tends to isolate the two, and to provide flow patterns that do not interfere with each other. The arcuate rear wall 26 that sweeps downwardly and outwardly also helps to direct the mixed air against the outside wall 13. It has been found that when the rear wall 26 is provided with an inwardly extending arcuate bump or protuberance 63, as is shown best in Figure 2, that the mixed air flowing through the passage 34 and outwardly therefrom through the discharge port 22, has a greater tendency to flow toward the wall 13 even though it would be expected that the inward convexity of the protuberance would bring about the opposite result. The arcuate protuberance 63, then, is a further aid in insuring the desired flow pattern of mixed air for perimeter heating of a room space.

In prior art of ceiling outlets the design has been to cause the air to leave the outlet in a diffusing pattern in order to entrain as much room air as possible. The thought being that the more room air entrained the more efficient the outlet. One of the most important features of this ceiling mixer deals with the fact that it is purposely designed to cause the outlet air to flow in as smooth a flowing pattern as possible. In this smooth flowing pattern the rapid outlet velocity at the nozzle aspirates room air into the mixer from near the ceiling. The smooth flowing outlet pattern, having very little turbulence, entrains but very little of room air on its downward projection path. Two things, therefore, cause the surprising result of hot air to reach the floor level in normal domestic installations. First, the initial aspiration of room air cools the high primary air source, reducing its bouyancy; and secondly, the then relatively heavier air leaving the mixer discharges downwardly with one side of the air stream adjacent to a wall of the room. This reduces the amount of entrainment, so the velocity of the air stream remains high enough to carry the air to the floor.

Once this smooth flowing non-turbulent air pattern from the mixer reaches the floor level, it is then caused to diffuse and turbulate on striking the floor level, thus entraining considerable room air at the floor level. Since it is still warmer than room air, the air stream mushrooms on the floor and then rises slowly up the outer wall surface.

It will be appreciated that while the invention has been described primarily in terms of structural elements, a method of heating a room space is inherent in the description of the invention and includes briefly the admission of room air from the upper levels of a room space and into a mixer located in the ceiling of the room space, wherein the room air is mixed with heated air and is discharged in mixed condition downwardly and outwardly so as to sweep across an outside wall of a room space, and down to the floor level thereof where it spreads out, and in flowing along the floor provides a perimeter flow pattern and heating of the room space.

While in the foregoing specification embodiments of the invention have been set forth, both as to structure and method, in considerable detail for purposes of adequately describing the invention, it will be apparent to those skilled in the art that numerous changes may be made in the details set forth without departing from the spirit and principles of the invention.

We claim:

1. In a heating system, a generally rectangular air mixer cabinet adapted to be mounted in an opening in the ceiling of a room, said cabinet having a pair of ports in the open bottom thereof adapted to be positioned adjacent the ceiling of a room for communication with the room space, said ports being angularly related to each other with adjacent portions of each port being lower than the remote portion, one of said ports providing an inlet for room air and the other an outlet for mixed air, the wall of said cabinet abutting only said inlet port having a heated air inlet opening adjacent the top of said cabinet, the wall of said cabinet abutting only said outlet port diverging at the bottom thereof from the first-mentioned wall and being curved at the top thereof toward said first-mentioned wall to direct incoming air from said heated air inlet opening toward said outlet, a partition element extending upwardly within said cabinet between said ports to separate the same, said partition element terminating a spaced distance below said heated air inlet opening to provide a channel for flow of air from said inlet port over said partition toward the outlet port under the influence of air entering said heated air inlet opening, said upwardly-extending partition element also diverging at the bottom thereof from said first-mentioned wall, and a damper mounted in said casing and pivotable about the lower edge of said heated air inlet opening for obstructing the same and thereby reducing the quantity of heated air entering said casing and flowing over said partition element toward said outlet port.

2. The structure of claim 1, in which the wall abutting only said outlet port is equipped with a horizontally-extending, inwardly-projecting arcuate protuberance adjacent the said outlet port.

3. An air mixer cabinet adapted to be mounted in an opening in a ceiling, comprising a generally rectangular casing having an open bottom, a pair of grills extending across said open bottom in side-by-side relation, said grills being angularly oriented with respect to each other and with the adjacent sides of said grills being lower than the remote portions thereof, a partition extending upwardly from between said pair of grills, said partition, with portions of said casings about one of said grills, defining an air-intake passage, said partition, with the remaining portion of said casing, defining an air-outlet passage terminating in the other grill, said air outlet passage communicating above said partition with the air intake grill, said partition and the casing wall opposite thereof forming part of said air outlet passage being downwardly and angularly outwardly inclined with respect to the casing wall opposite said partition and forming part of said inlet passage, heated air supply conduit means entering said casing adjacent the top thereof and in the last-mentioned opposite wall, the said partition terminating a spaced distance below the top of said casing to permit heated air flow from said supply means into said air outlet entrance of said supply conduit means for limiting the flow of heated air into said casing and arranged to direct air from said supply conduit over said partition and toward said outlet passage.

4. A hot air heating apparatus for heating a room, comprising a generally rectangular casing supported for the most part above the ceiling of the room but having a depending portion extending through the ceiling and providing angularly related openings, one of said openings serving as an air inlet and the other serving as an air outlet, said outlet being inclined toward a wall of the room while the inlet is inclined toward a central portion of the room, said casing having three substantially vertical side walls and a fourth side wall inclined upwardly and toward its opposing wall, an opening in said opposing wall communicating with a heated air supply conduit, a partition between said fourth wall and said opposing wall, said partition being inclined in the same direction as said fourth wall and extending from below said ceiling between said openings to a point spaced from the top of said casing to permit heated air flow from said supply conduit opening toward said outlet, said conduit being arranged to direct heated air under the top of said casing and over said partition against a curved portion of said fourth wall and toward said outlet, and a damper for said conduit positioned adjacent the inlet of said conduit in said casing and arranged to direct incoming heated air over said partition toward said outlet.

(References on following page)

References Cited in the file of this patent

UNITED STATES PATENTS

| | | |
|---|---|---|
| 135,507 | Barker | Feb. 4, 1873 |
| 1,640,187 | Gray | Aug. 23, 1927 |
| 2,217,944 | Collicutt | Oct. 15, 1940 |
| 2,422,560 | Palmer | June 17, 1947 |
| 2,422,782 | Hemming | June 24, 1947 |
| 2,541,280 | Phillips | Feb. 13, 1951 |
| 2,674,934 | Tutt | Apr. 13, 1954 |
| 2,724,320 | Tutt | Nov. 22, 1955 |
| 2,737,875 | Kurth et al. | Mar. 13, 1956 |
| 2,750,865 | Tutt | June 19, 1956 |
| 2,759,490 | Phillips et al. | Aug. 21, 1956 |
| 2,787,946 | Gannon | Apr. 9, 1957 |